United States Patent
Liu

(10) Patent No.: US 9,539,644 B2
(45) Date of Patent: Jan. 10, 2017

(54) TAILSTOCK FOR MACHINE TOOLS

(71) Applicant: TAIWAN TAKISAWA TECHNOLOGY CO., LTD., Taoyuan County (TW)

(72) Inventor: Chun-I Liu, Taoyuan County (TW)

(73) Assignee: TAIWAN TAKISAWA TECHNOLOGY CO., LTD., Taoyuan County (TW)

( * ) Notice: Subject to any disclaimer, the term of this patent is extended or adjusted under 35 U.S.C. 154(b) by 0 days.

(21) Appl. No.: 14/804,916

(22) Filed: Jul. 21, 2015

(65) Prior Publication Data

US 2016/0184901 A1  Jun. 30, 2016

(30) Foreign Application Priority Data

Dec. 30, 2014  (TW) .............................. 103223309 U

(51) Int. Cl.
*B23B 23/00* (2006.01)
*B23Q 1/28* (2006.01)

(52) U.S. Cl.
CPC .......... *B23B 23/00* (2013.01); *B23B 2270/025* (2013.01)

(58) Field of Classification Search
CPC ........ B23B 23/00; B23B 23/02; B23B 23/025; B23B 23/005; B23B 23/04; B23B 23/045; B23Q 1/28; B23Q 1/282; B23Q 1/285; B23Q 1/287
See application file for complete search history.

(56) References Cited

U.S. PATENT DOCUMENTS

| | | | | | |
|---|---|---|---|---|---|
| 2,115,094 | A | * | 4/1938 | Bucklein | B23B 23/005 82/148 |
| 2,860,538 | A | * | 11/1958 | Bruet | B23B 23/005 403/355 |
| 3,376,770 | A | * | 4/1968 | Tlusty | B23B 23/00 82/148 |
| 3,600,988 | A | * | 8/1971 | Davis | B23B 23/005 82/148 |
| 3,867,856 | A | * | 2/1975 | Ota | B23B 23/005 451/397 |
| 4,068,547 | A | * | 1/1978 | Ito | B23B 23/005 451/397 |
| 2011/0283846 | A1 | * | 11/2011 | Pu | B23B 23/00 82/148 |
| 2013/0061726 | A1 | * | 3/2013 | Katsu | B23B 23/00 82/1.11 |
| 2013/0276600 | A1 | * | 10/2013 | Tsai | B23B 23/00 82/121 |
| 2016/0184901 | A1 | * | 6/2016 | Liu | B23B 23/00 82/148 |

* cited by examiner

*Primary Examiner* — Will Fridie, Jr.
(74) *Attorney, Agent, or Firm* — WPAT, PC; Justin King

(57) ABSTRACT

A tailstock includes a main body, a lathe center unit arranged in a hollow hole of the main body, a sliding base coupled with the main body and having a slider configured at a side thereof for pairing a slide rail, and a clamping unit configured in the sliding base. The clamping unit for increasing clamping force of the tailstock further includes a connection plate having at least one positioning hole to connect the main body, at least one hydraulic rod bridging the slider and the main body, a plurality of loading devices ring-set about the hydraulic rod, and a plurality of sleeves ring-set with the corresponding loading devices.

5 Claims, 4 Drawing Sheets

TAILSTOCK FOR MACHINE TOOLS

This application claims the benefit of Taiwan Patent Application Serial No. 103223309, filed Dec. 30, 2014, the subject matter of which is incorporated herein by reference.

BACKGROUND OF INVENTION

1. Field of the Invention

The invention relates to a tailstock for machine tools, and more particularly to the tailstock for lathes that provide a clamping unit to increase the clamping force of a tail hydraulic tank of the lathe.

2. Description of the Prior Art

The conventional lathe is a machine tool that is specified in machining longitudinal work pieces with a round cross section. While in applying lathe to machine a work piece, one end of the work piece is fixed to a rotational spindle, while another end thereof is connected with a tailstock. Generally, the tailstock has a main body mounted fixedly to a station frame of the lathe. The main body may be equipped with a protruding lathe center for point-contacting the work piece so as to align the central line of the work piece and the rotational axis of the lathe. In performing the engagement between the work piece and the tailstock, the tailstock is moved manually or by a hydraulic force to protrude the lathe center toward the free end of the work piece till a tight contact is confirmed between the lathe center and the work piece.

However, as the dimension of the work piece to be machined by the lathe increases, the weight of the work piece as well as the load in the lathe becomes heavier. Thus, it is necessary to introduce a heavy-duty tailstock so as to meet the loading need. In the art, the one-piece piston design for each lateral side of the tailstock is believed no longer to meet the requirement of an upgraded clamping force. However, in the circumstance of the limited space available around the lathe tailstock, it is almost impossible to upgrade the tailstock for meeting the need of increasing clamping force for holding the work piece. Namely, it is an urgent need in an improved lathe tailstock for resolving the loading problem while in meeting a heavy-duty situation.

SUMMARY OF THE INVENTION

Accordingly, it is the primary object of the present invention to provide a tailstock for machine tools, especially for the lathes, that is a multi-stage piston design and can increase the whole clamping force of the tailstock without an additional increase of the installation space or change of the appearance thereof by introducing a specific arrangement of components within the limited space inside the tailstock.

In the present invention, the tailstock for machine tools is applied to a lathe that has an oblique surface and a slide rail longitudinally extending toward opposing lateral sides of the lathe along a direction of the oblique surface. The lateral sides of the lathe are defined with a specific axial direction. The tailstock for machine tools comprises a main body, a lathe center unit, a sliding base and a clamping unit.

The main body has a hollow hole.

The lathe center unit is mounted inside the hollow hole of the main body by being parallel to the specific axial direction.

The sliding base fixed by locking to a side of the main body has a slider at a side thereof respective to the slide rail, where the slider engages the slide rail in a sliding manner.

The clamping unit inserted inside the sliding base further has a connection plate, at least one hydraulic rod, a plurality of loading devices and a plurality of sleeves. The connection plate inserted inside the main body further has at least one positioning hole. The at least one hydraulic rod has one end thereof to couple the slider, while another end thereof contacts a bottom surface of the main body. The plurality of loading device sleeve in order about the hydraulic rod. The plurality of sleeves ring-set individually about the hydraulic rod by contacting the respective loading device.

In the present invention, a surface of the loading device neighboring the connection plate further includes at least one position pin to mate the respective positioning hole of the connection plate.

The tailstock for machine tools of the present invention utilizes the hydraulic rod to construct a plurality of loading devices within the limited space inside the hollow hole. After testing, the clamping force provided by the tailstock of the present invention, even without increasing any volume of the tailstock, is at least three times of the force provided by the conventional tailstock, such that the aforesaid problem described in the background section can be substantially resolved.

All these objects are achieved by the tailstock for machine tools described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a tailstock for machine tools. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2:
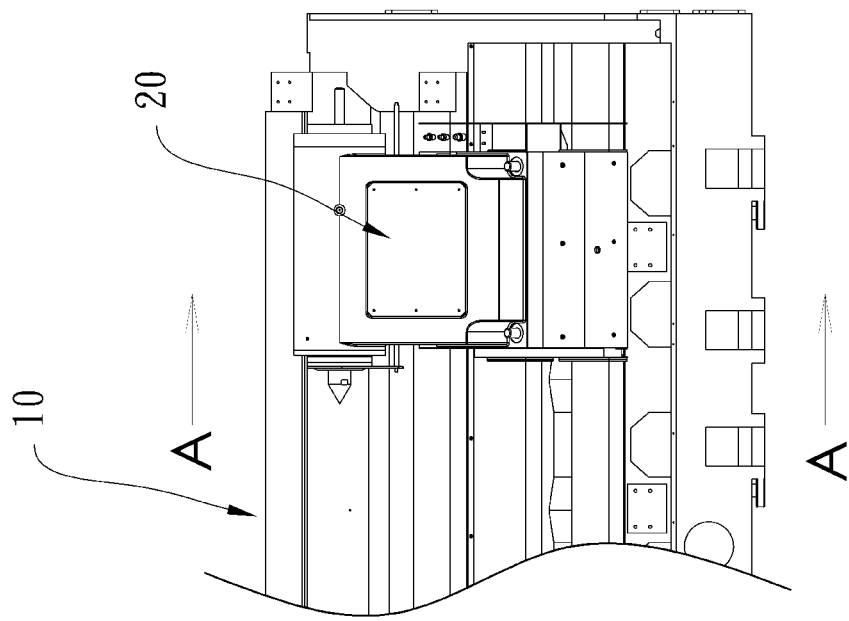
FIG. 2 is a side view of FIG. 1.
Figure 1:
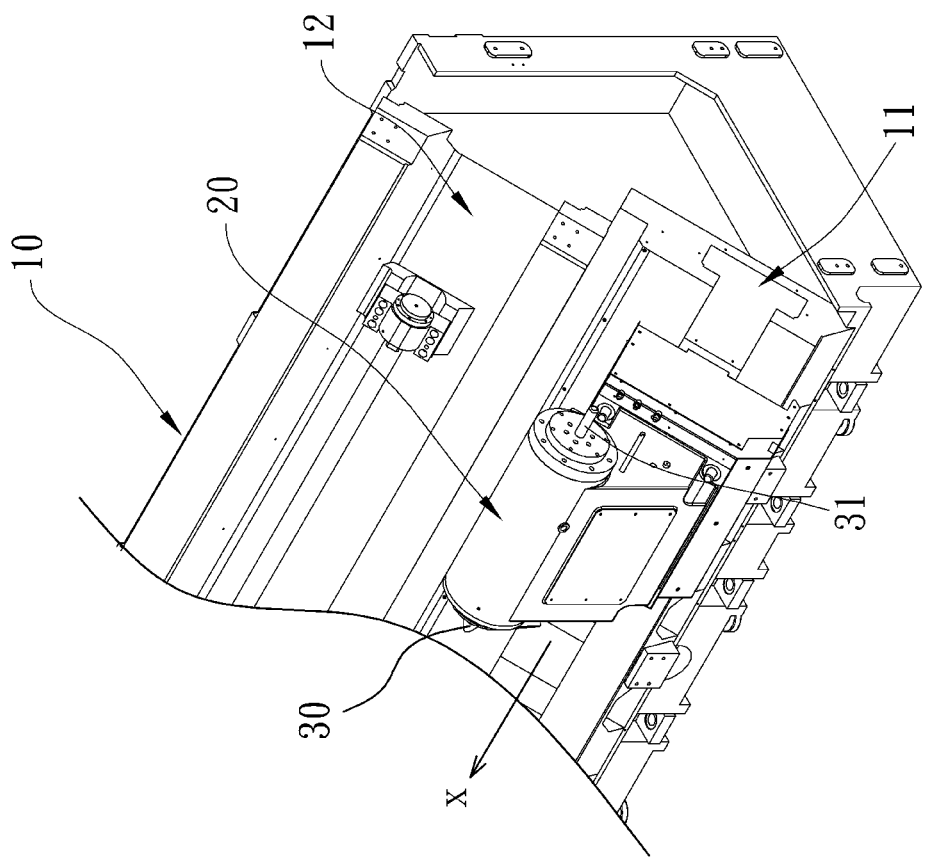
FIG. 1 is a schematic perspective view of the preferred tailstock for machine tools in accordance with the present invention, mounted at a portion of the lathe.

Referring now to FIG. 1 and FIG. 2, the preferred tailstock 20 of the present invention is shown to be mounted at a specific part of the lathe. An oblique surface 12 is shown to be located between a top surface 12 and a bottom surface of the main frame 10 of the lathe, and a slide rail 11 is longitudinally extended toward opposing lateral sides of the main frame 10 along a direction of the oblique surface 12. The lateral sides of the lathe (also, the main frame 10) are defined with a specific axial direction X. The tailstock 20 is thus mounted on the slide rail 11.

Figure 3:
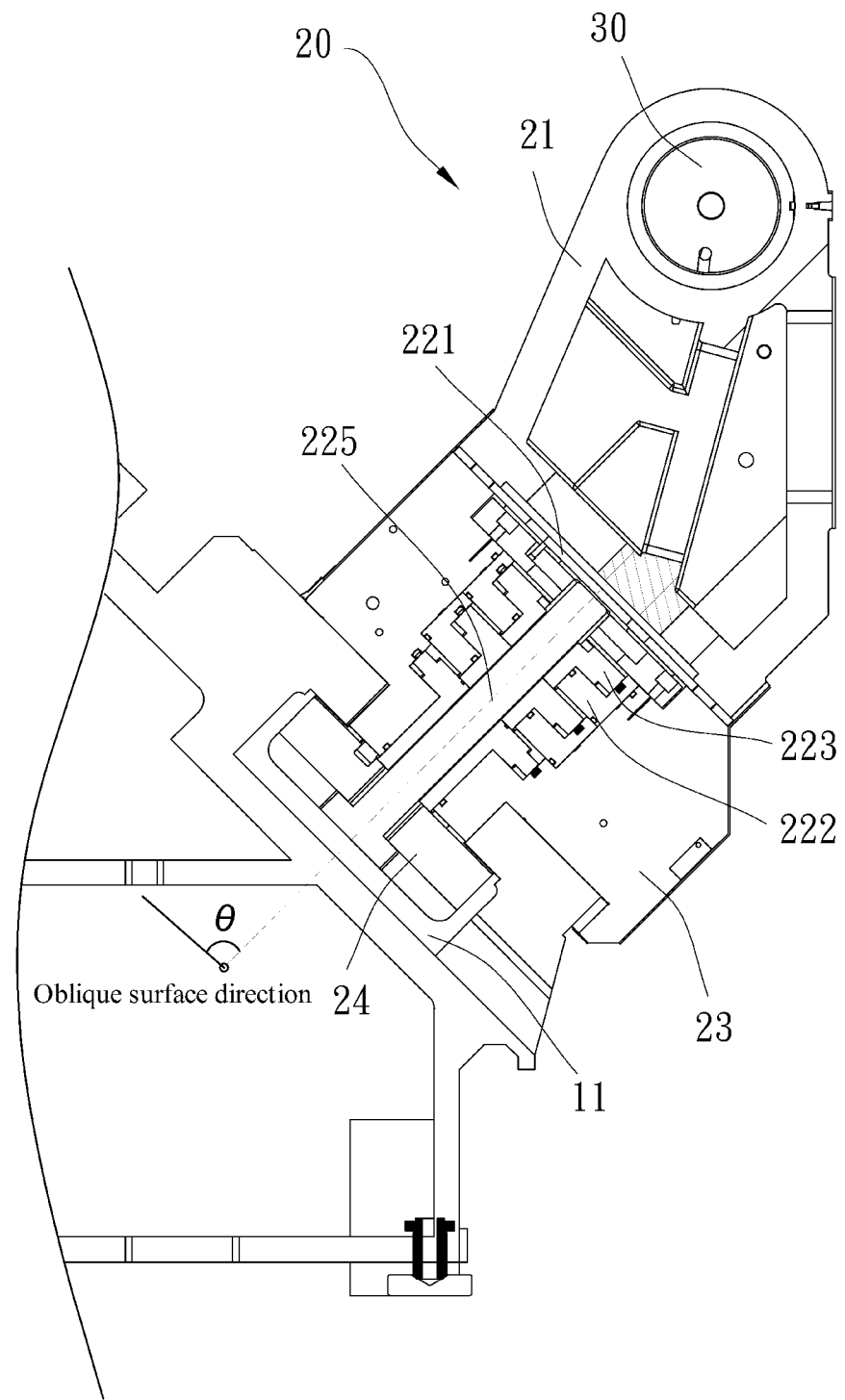
FIG. 3 is a cross-sectional view of FIG. 2 along line A-A.
Figure 4A:
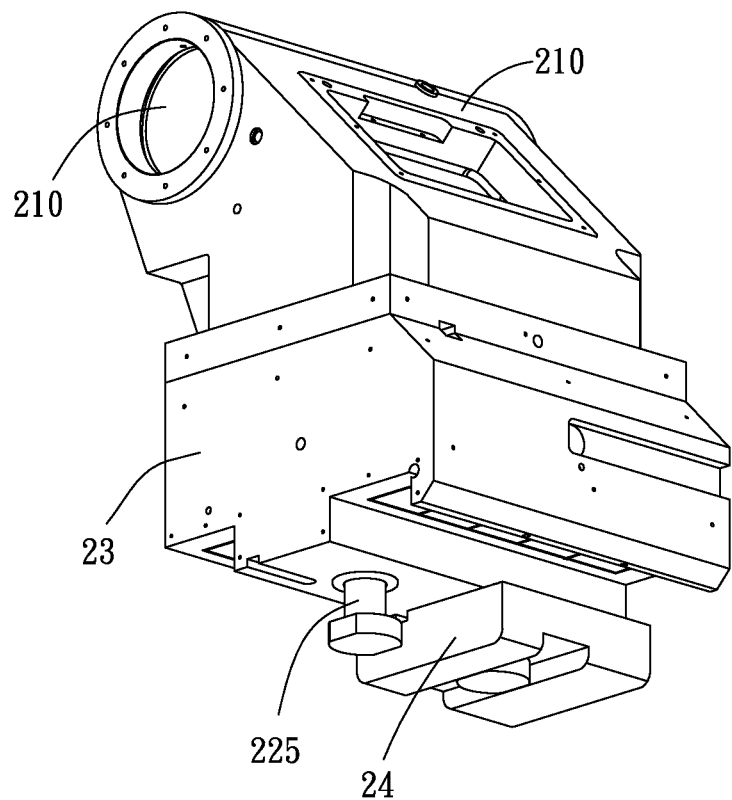
FIG. 4A is a perspective view of the tailstock for machine tools of FIG. 1.
Figure 4B:
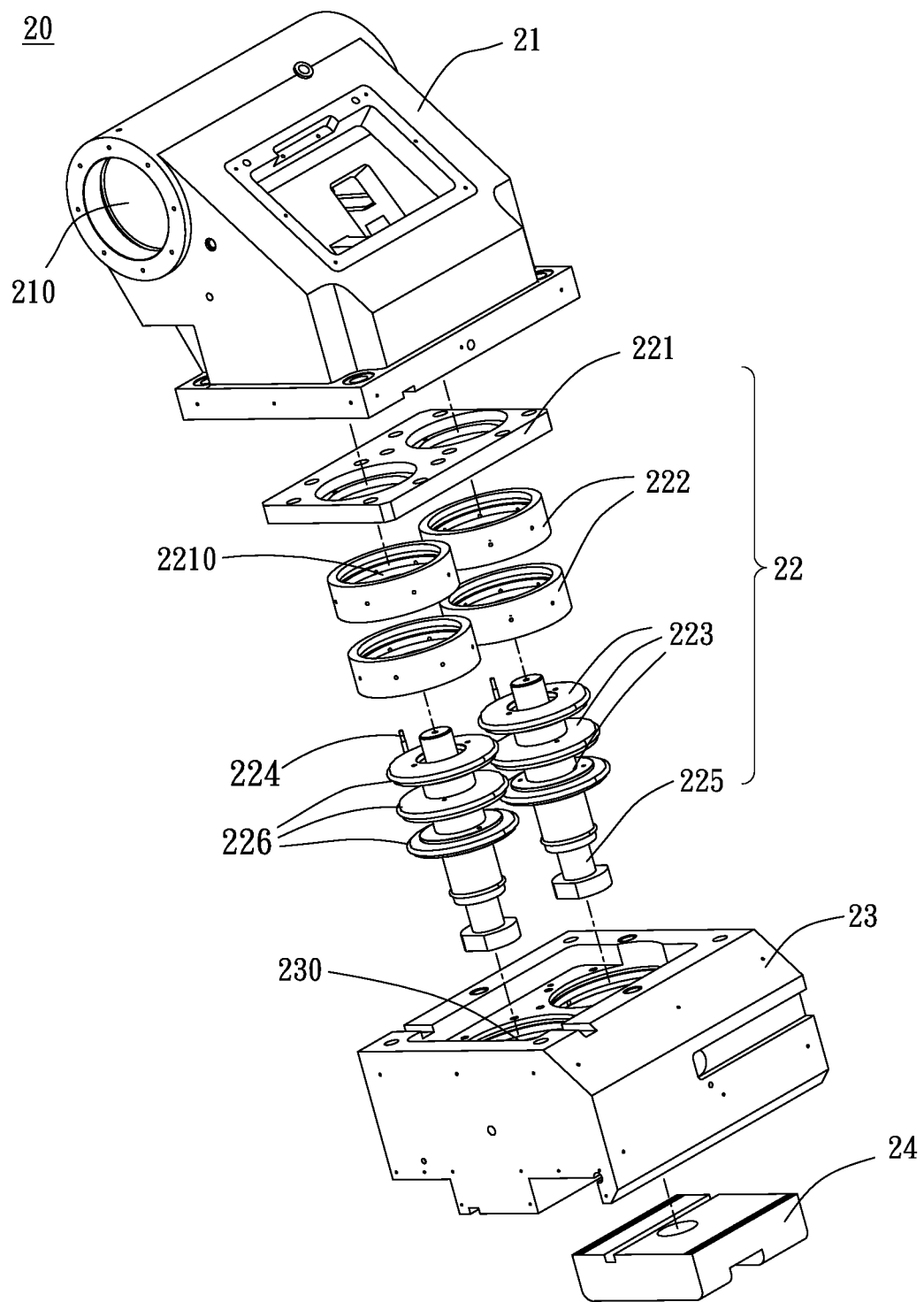
FIG. 4B is an exploded view of FIG. 4A.

Refer also to FIG. 3, FIG. 4A and FIG. 4B. As shown, the tailstock 20 includes a main body 21, a sliding base 23, a lathe center unit 30 and a clamping unit 22.

The main body 21 has a hollow hole 210 for mounting the lathe center unit 30.

The lathe center unit 30 inserted inside the hollow hole 210 of the main body 21 is posed, but not limited thereto, by being parallel to the specific axial direction X. One end of the lathe center unit 30 provides a center (not shown in the figure) aligned with the extending direction of the work piece for pin-contacting and thus supporting the work piece, while another end thereof is coupled with a foreign driving apparatus (not shown in the figures) so as to drive the tailstock 20 to displace along the slide rail 11. The drive apparatus can be a combination of a screw bar, a bearing set and a servo motor, a combination of a hand wheel and a screw bar, or any the like per practical needs.

The sliding base 23 can be a rectangular block having at least one accommodation hole 230. A major direction connecting opposing sides of the bottom surface of the sliding base 23 is parallel to the slide rail 11, and the sliding base 23 also provides screw holes to anchor and thus fix the main body 21. The side (bottom side) of the sliding base 23 further has a slider 24 for pairing the slide rail 11. By having the slider 24 to displace along the slide rail, a sliding manner between the tailstock 20 and the slide rail 11 can be established.

The clamping unit 22 inserted inside the sliding base 23 further has a connection plate 221, tt least one hydraulic rod 225, a plurality of loading device 222 and a plurality of sleeve 223.

The connection plate 221 provides thereon at least one connection hole 2210 (two shown in the figure) and is to be received and thus fixed to a bottom of the main body 21. One side of the connection plate 221 away the main body 21 can have at least one positioning hole (not labeled in the figure) for serving a positioning purpose.

One end of the hydraulic rod 225 is coupled with the slider 24, while another end thereof protrudes out of the connection hole to contact the bottom surface of the main body 21. In the figure, two hydraulic rods 225 are shown, yet such an arrangement is simply one of various embodiments in accordance with the present invention.

The plurality of loading devices 223 is to ring-set and thus be fixed in order about the hydraulic rod 225. As shown, in the preferred embodiment, the clamping unit 22 has two hydraulic rods 225, and each of the two hydraulic rods has three loading devices 223, such that a two-side three-stage arrangement pattern can be formed. Upon such an arrangement, the overall clamping force of the tailstock 20 can be raised without varying the originally-limited space inside the tailstock 20.

The plurality of sleeves 222 ring-set respectively about the hydraulic rod 225 is to encircle and fix by contacting the respective loading devices 223. The spacing between the sleeve 222 and the respective loading device 223 can be filled with an oil seal 226 (for example, an oil ring), such that a tight seal formation in between can be formed.

In the present invention, the tailstock for machine tools is characterized on that the high-pressure hydraulic oil flows to a lower chamber under the loading device 223 via the sliding base 23 and the sleeves 222, while the low-pressure hydraulic oil flows to an upper chamber of the loading device 223. With the oil seals 226 of the corresponding sleeve 222 to separate the high-pressure hydraulic oil and the low-pressure hydraulic oil, the pressure difference in between can push the loading device 223 and the hydraulic rod 225 to displace upward and simultaneously generate a clamping force. In the preferred embodiment, three loading devices 223 are included, and thus three times of the oil pressure can be provided by compared to the design with a single loading device. Thus, three times of the clamping force can be generated as well.

In the present invention, at least one position pin 224 located at the loading device 222 neighboring the connection plate 221 can be introduced to mate the respective positioning hole of the connection plate 221, such that, while the clamping unit 22 is loaded or is displaced, possible shake and thus the position bias can be reduced to a minimum through the position function performed by the pair of the position pin 224 and the respective positioning hole. Further, the hydraulic rod 225 and the oblique surface 12 are arranged by an angle θ. The angle θ can be 90 degrees, or an angle ranged from 0~180 degrees.

In the present invention, by considering the limited space inside the sliding base 23 of the tailstock 20, a single hydraulic rod 225 can be allotted to the clamping unit 22 by sleeving thereabout several loading devices 223. Namely, in the present invention, each of the hydraulic rods 225 is equipped with three loading devices 223. Such a two-side three-stage arrangement pattern can be formed. After testing, the clamping force provided by the tailstock of the present invention, even without increasing any volume of the tailstock, is at least three times of the force provided by the conventional tailstock, such that the aforesaid problem described in the background section can be substantially resolved.

While the present invention has been particularly shown and described with reference to a preferred embodiment, it will be understood by those skilled in the art that various changes in form and detail may be without departing from the spirit and scope of the present invention.

What is claimed is:

1. A tailstock for machine tools, applied to a lathe having an oblique surface and a slide rail longitudinally extending toward opposing lateral sides of the lathe along a direction of the oblique surface, the lateral sides of the lathe being defined with a specific axial direction, comprising:
    a main body, having hollow hole;
    a lathe center unit, mounted inside the hollow hole of the main body by being parallel to the specific axial direction;
    a sliding base, fixed by locking to a side of the main body, having a slider at a side thereof respective to the slide rail, the slider engaging the slide rail in a sliding manner; and
    a clamping unit, inserted inside the sliding base, further comprising:
    a connection plate, inserted inside the main body, further having at least one positioning hole;
    at least one hydraulic rod, one end of the hydraulic rod being coupled with the slider while another end thereof contacts at a bottom surface of the main body;
    a plurality of loading devices, fixed to the hydraulic rod by sleeving in order about the hydraulic rod;
    a plurality of sleeves, ring-set individually about the hydraulic rod by contacting the respective loading devices;
        wherein a surface of the loading device neighboring the connection plate further includes at least one position pin to mate the respective positioning hole of the connection plate.

2. The tailstock for machine tools of claim 1, wherein the clamping unit includes two said hydraulic rods, and each of the two hydraulic rods is equipped with three said loading device, such that a two-side three-stage arrangement pattern is formed.

3. The tailstock for machine tools of claim 1, wherein the hydraulic rod of the clamping unit forms a 90-degree angling arrangement with the oblique surface.

4. The tailstock for machine tools of claim 1, wherein the hydraulic rod of the clamping unit forms a 0~180-degree angling arrangement with the oblique surface.

5. The tailstock for machine tools of claim 1, wherein a side of the lathe center unit is coupled with a drive apparatus having a screw bar, a bearing set and a servo motor.

\* \* \* \* \*